Patented Mar. 8, 1927.

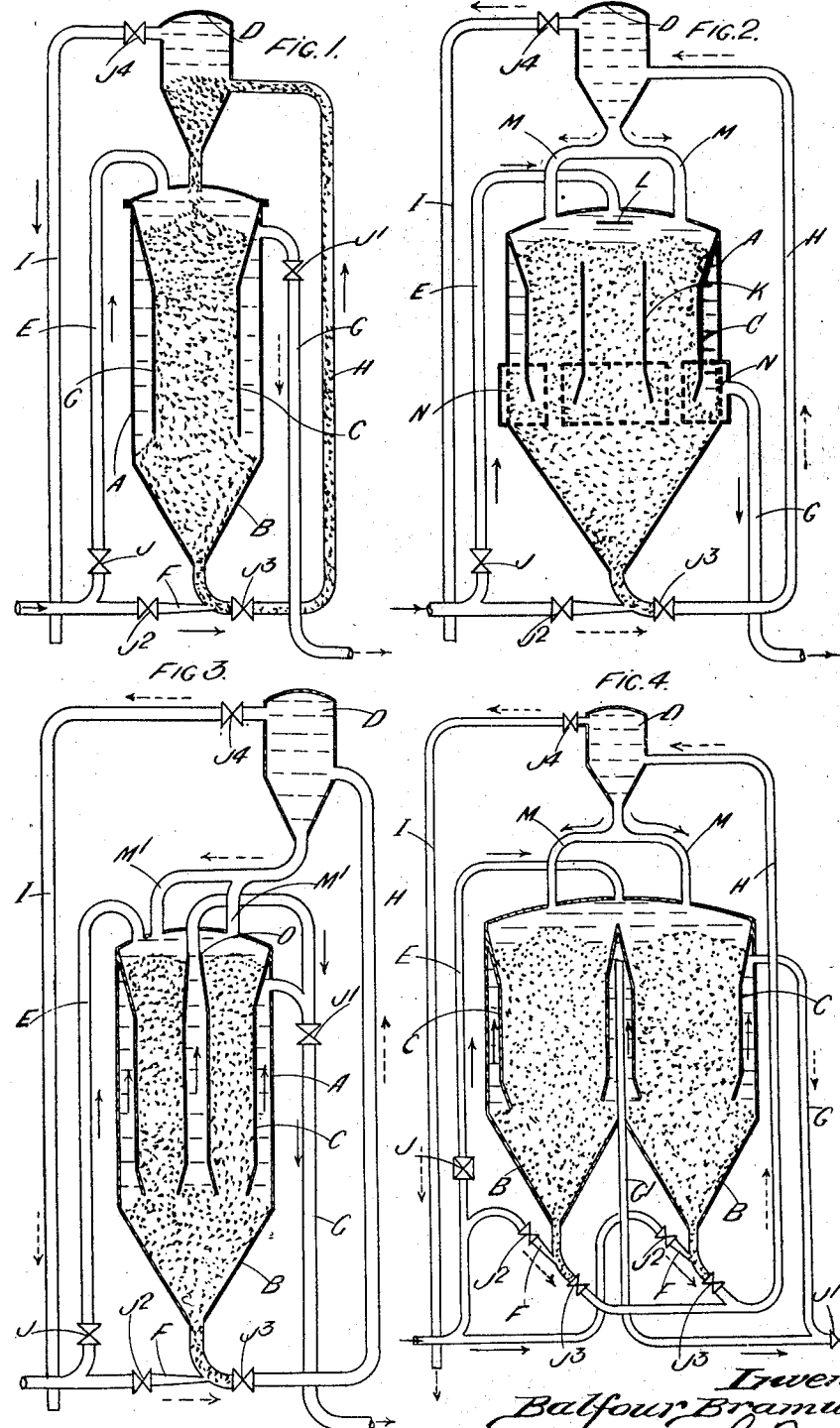

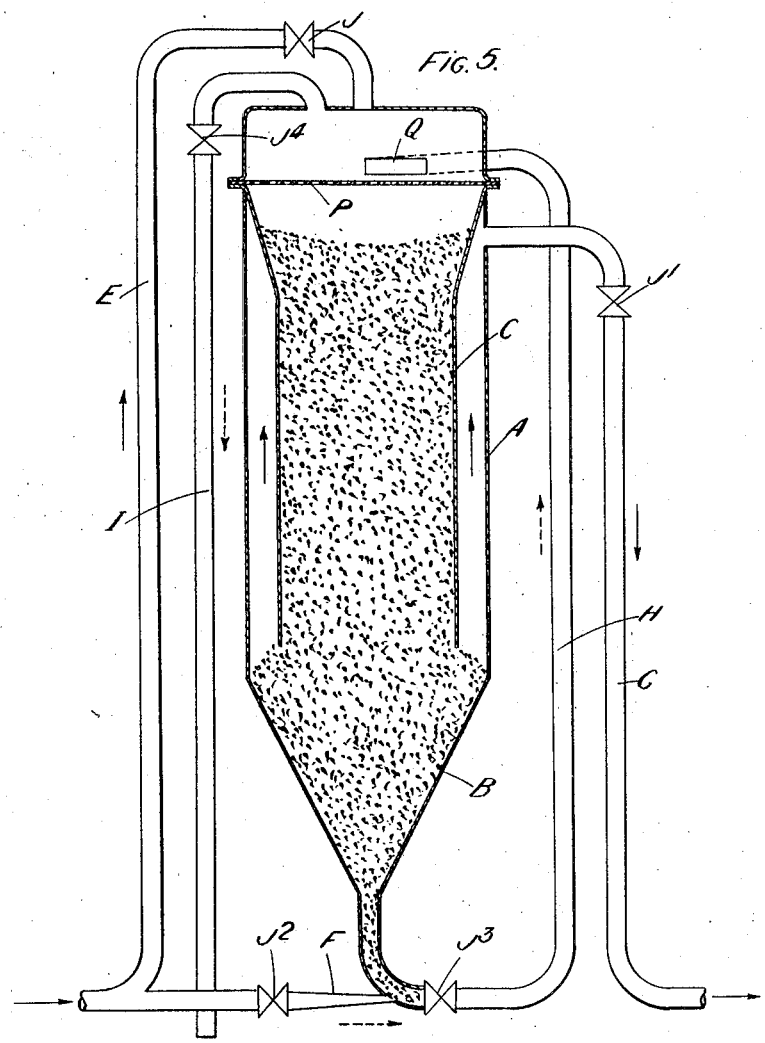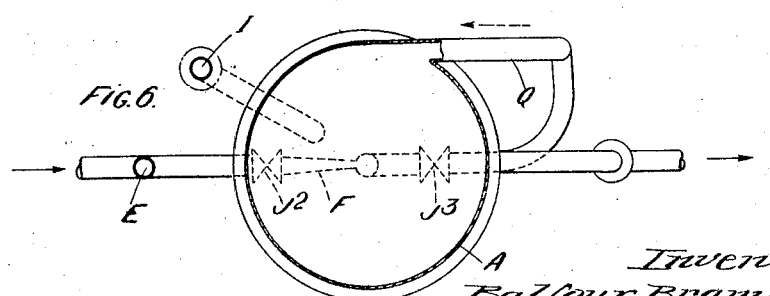

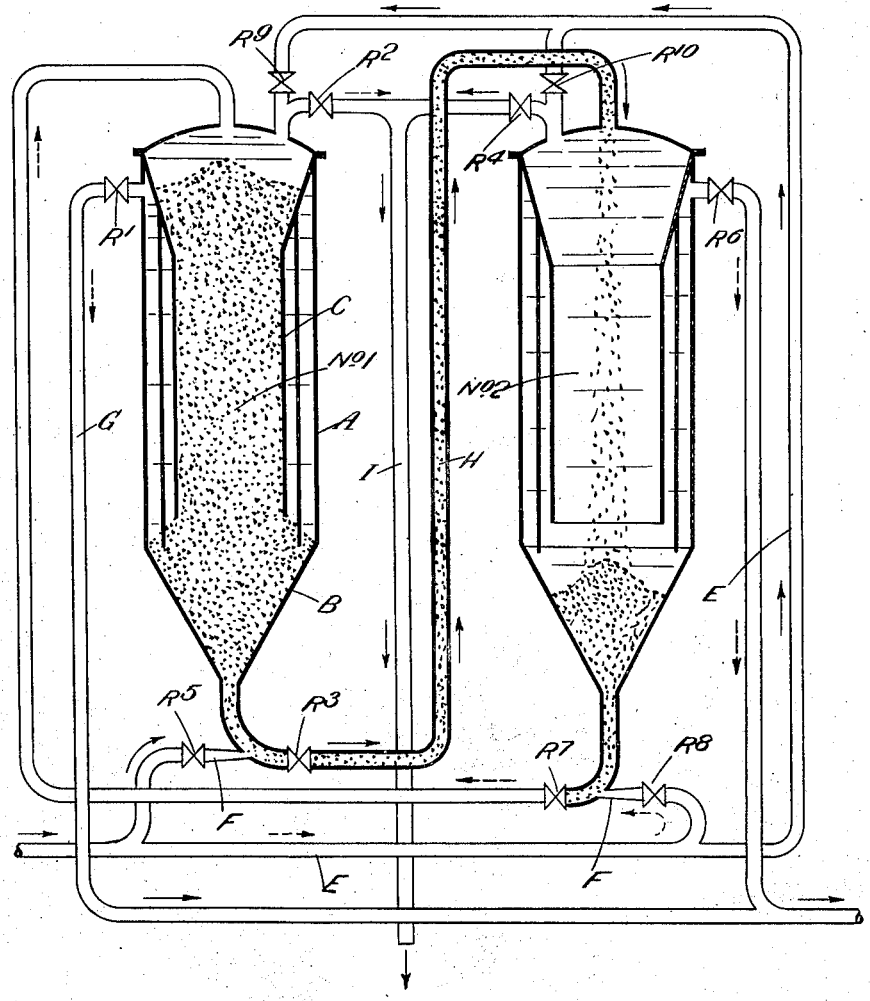

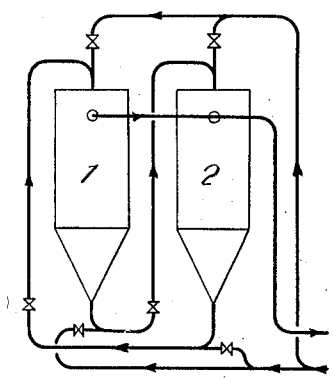
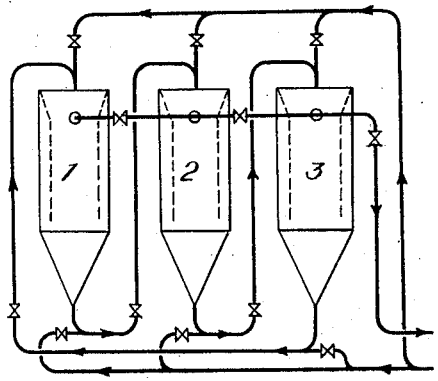
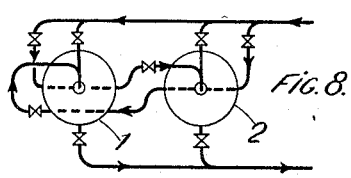
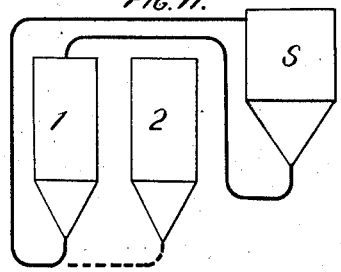
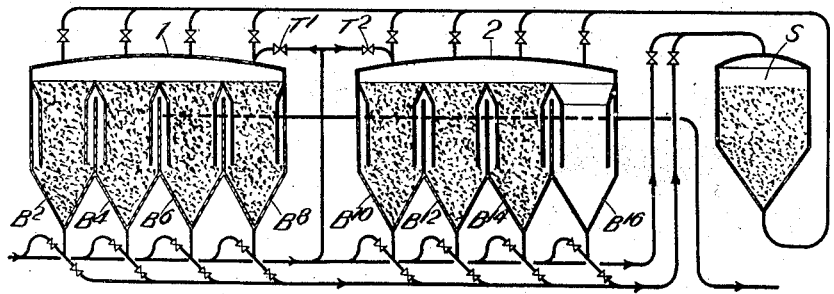
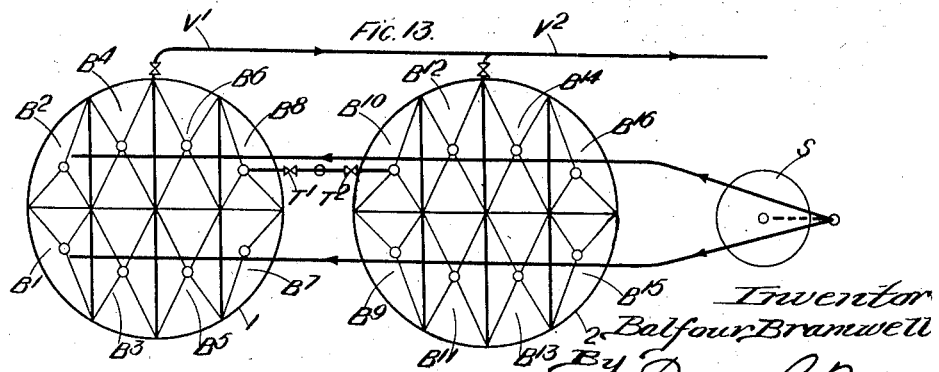

1,620,431

UNITED STATES PATENT OFFICE.

BALFOUR BRAMWELL, OF BELFAST, IRELAND.

FILTERING APPARATUS.

Application filed June 14, 1926, Serial No. 115,900, and in Great Britain February 11, 1925.

This invention relates to filtering apparatus of the kind in which fine sand or other suitable finely divided material forming the filtering medium is supported in the filter chamber in such a manner that the whole of the filter bed may be cleansed by the withdrawal, in small quantities at a time, of the sand from one part of the filter system which sand, after cleansing in a suitable washing chamber, is returned to another part of the filter system, as for example by transference from the lowest point of the filter bed and deposition after washing upon the surface thereof.

One of the objects of the invention is to eliminate the formation of any stationary sand in the filter bed and to ensure that the whole of the bed is disturbed and efficiently washed by the cleansing process, and this without any necessity to revolve the filter chamber or use a reverse flow through the filter bed.

Another object of the invention is to ensure the most effective use of the filtering material and prevent loss of the medium with the stream of filtrate, with which object the said stream or streams are caused to leave the filtering medium while travelling in an upward direction.

Another object of the invention is the elimination of perforated plates for supporting the filtering medium or of pipes and nozzles within the filtering chamber for collecting the filtrate and distributing the wash water.

According to the present invention an arrangement is provided whereby the liquid to be filtered flows in substantially vertical stream lines downwards through the effective part of the filter bed and the filtrate leaves the filter bed in an upward direction, the filtering material being self-supported in the filter chamber in such a manner that the whole of the filtering material may be withdrawn from the lowest point of the filter chamber for cleansing, the cleansed filtering material being subsequently returned to the filtering system.

To provide for collecting the filtrate at the bottom of the filter bed, instead of having the usual platform with nozzles or perforated plates and gauze or perforated pipes, an annular collecting chamber is formed around the body portion of the filter chamber by means of a depending liner which is closed against the filter wall at the top and is open at the bottom. The water in leaving the effective depth of the filter bed, which may conveniently be from the upper surface down to the beginning of the tapering part of the filter chamber, turns upwards into the annular chamber, the mouth of which is sufficiently wide to ensure that the velocity of the filtrate stream at this point will be comparatively small. Since, therefore, the filtrate leaves the sand in an upward direction and at a comparatively low speed, no filtering medium can possibly be carried away with the effluent filtrate.

The withdrawal of the sand from the bottom of the chamber and its transference to a washing apparatus may be effected or promoted by means of a jet of water, injector fashion, in the known manner, the washing chamber being conveniently situated upon or near the top of the filter, so that the washed sand can be deposited directly upon the surface of the filter bed.

Instead of returning the sand, when washed, to the same chamber, there may be provided an additional chamber, which may or may not be one of the filter chambers, in which the washed sand is separated from the washing water and from which it may be returned either to the filter chamber from which it was withdrawn in the first instance, or to another filter chamber; or the additional chamber when filled with washed sand may itself be brought into use as a filter chamber. It is thus possible to have many filtering units with one common washing and sand and water separating chamber.

The invention will be more particularly described with reference to the accompanying drawings, wherein Figs. 1–6 are diagrammatic drawings illustrating one embodiment of the invention and Figs. 7–13 are diagrammatic drawings illustrating another embodiment of the invention.

Referring to Fig. 1 the filter chamber is formed with a main body wall A of cylindrical or rectangular shape and open or closed at the top, while the bottom is in the form of an inverted conical or pyramidal wall B having an outlet at the apex of the cone for the discharge of the sand and water. A depending magazine C is attached to the upper part of the filter chamber and is open at the bottom in order to form an annular chamber between the wall of the filter chamber and said magazine for the passage and discharge of the filtrate in an upward direction. D is the sand-washing chamber which is situated above the filter chamber and is in communication therewith. J, J', J², J³, J⁴ are valves controlling the entrance and discharge pipes of the filter system. In operation and when filtering the water, the valves J, J' are open and all the others are closed. Water enters the pipe E and is discharged above the sand in the chamber A and flows down through the filter bed in substantially vertical stream lines. The water upon leaving the effective part of the filter bed, which is preferably when it passes the end of the magazine C, turns upwards into the annular chamber formed thereby and is discharged through the pipe G.

When it is required to cleanse the sand, valve J' is closed and valves J², J³, J⁴ are opened. Clean water is injected under sufficient pressure through the pipe F into the sand in the pipe leading from the apex of the cone B and the kinetic energy of this water stirs up the sand and washes it up through the pipe H into the washer or separator D, where the sand and water are separated, the cleansed sand being returned to the filter chamber, while the dirty water is led away through the pipe I either to waste or to a settling tank, where the impurities settle down and are drawn off as sludge and the settled water used again for washing purposes. During the cleansing operation the valve J is kept partially open, in order to maintain the pressure in the filter chamber.

In order to ensure more or less vertical stream lines down through the filter bed, the latter may be fitted with depending baffles. Such a construction is illustrated in Fig. 2, wherein the filter bed is divided into vertical sections by means of baffles K. The operation of this apparatus is similar to that shown in Fig. 1, the washed and separated sand being returned to the filter chamber through branch pipe M and a baffle L being provided, if required, in order to divert the incoming water to the outer filter beds. Since the filtrate leaves the sand in an upward direction and at a comparatively low speed, no sand is carried away with the effluent filtrate. Should, however, the outlet openings be low, as for example in Fig. 2, the risk of some of the sand escaping into the filtrate is obviated by providing perforated plates or gauzes N over the outlet openings or at any other suitable point between the sand and the outlet openings. When such perforated plates or gauzes are used they do not bear the weight of any of the sand, but act merely as a means for preventing the sand from being carried away with the effluent filtrate.

In Fig. 3, in addition to the annular chamber leading to the outlet for the filtrate, a central pipe O is provided which opens at the bottom into the filtering bed either at the same level or at a different level from the mouth of the annular chamber, and passes vertically upwards through the top of the filter chamber A, if the latter is closed, and thence leads to the discharge pipe G for the filtrate. More than one of these pipes O may be provided if required.

In Fig. 4, instead of forming the filter chamber with a single conical or pyramidal bottom, each chamber A is formed with two such cones or pyramids B, although more than two may be provided if required. Each one is provided with a sand ejector F and the sand from the several outlets is preferably discharged into a single sand washer and separator from which it is distributed over the upper surface of the filter bed by means of a plurality of discharge pipes M leading from the washing chamber D.

Figs. 5 and 6 illustrate in elevation and plan respectively, a filter unit wherein the sand washing and separating chamber is formed as a portion of the filter chamber by means of a perforated plate P which separates the top of the filter chamber into a sand washer and separator. The sand and washing water flow through the pipe H into said compartment through a branch pipe Q opening into the side thereof, thereby giving the sand and water a circular motion.

While the entire filter bed can be washed by a continuous or intermittent withdrawal from the lowest point and conveyance to a washing and separating chamber independently of any reverse flow of water through pipes, or nozzles or perforated plates at the bottom of the filter bed, it may sometimes be convenient to provide for the removal of accumulated impurities from the upper surface of the filter bed. This may be done by a reverse flow down the annular chamber, for example by opening the valve J', and up through the filter bed, while at the same time the surface of the latter is broken up by revolving rakes, the dirty water passing out through an outlet from the water space near the top of the filtering chamber.

Figs. 7–13 illustrate another embodiment of the present invention wherein, instead of returning the washed sand to the same chamber, it is preferred to provide one or more additional chambers which form a filtering unit in which each chamber may be used as a filter chamber and a sand and dirty water separator.

Figs. 7 and 8, which are diagrammatic drawings in elevation and plan respectively, illustrate an arrangement wherein two filter chambers are employed which operate in the same manner as described with reference to the other figures, but instead of returning the sand to the same chamber, for example chamber No. 1, it is ejected into chamber No. 2, which is empty, and when all the sand has been washed and discharged into this latter chamber this then becomes the filter chamber. The same process is repeated when it is required to discharge the sand from No. 2 chamber to No. 1.

In Fig. 9 an arrangement is illustrated in which three chambers are employed in association with each other. When working with three chambers, if for example No. 3 chamber is empty at a given time and Nos. 1 and 2 chambers require cleansing, the filtering material is transferred in the manner described from No. 2 to No. 3 chamber and cleansed in the process, leaving No. 2 chamber empty to receive the filtering material from No. 1 chamber when that in turn requires cleansing. No. 1 chamber is then available to receive the sand from No. 3 chamber.

In either of the alternatives illustrated in Figs. 7–9 the pipe through which the sand is forced from the full chamber to the empty one forms the sand washer. As the sand falls into the chamber the dirty water overflows to waste and a slight upward current of clean water is passed through the chamber whilst the same is settling in it in order to wash out all the impurities and leave the sand clean in the chamber. Each chamber, therefore, in turn becomes a filter chamber and a sand and dirty water separator.

Fig. 10 illustrates the operation of an apparatus using two chambers. When filtering with No. 1 chamber in action valves $R'$ and $R^9$ are open. As in the other cases, water enters through the pipe E above the sand, filters down through the filter bed, is turned upwards into the annular space and is discharged through the pipe G. In order to cleanse the sand in No. 1 chamber, valves $R'$, $R^2$ and $R^{10}$ are shut and $R^3$, $R^4$ are opened, and valve $R^5$ is partly opened, according to the pressure required. Valves $R^7$, $R^8$ on No. 2 chamber are closed and valve $R^9$ is kept slightly open to give a reverse flow upwards through No. 2 chamber. The kinetic energy of the water at F starts the sand in motion and washes it up through the pipe H to the top of No. 2 chamber. The sand falls to the bottom of this chamber, gradually filling it, and the water which has been used to wash and transfer the sand from No. 1 chamber is run to waste through pipe I. When the sand has thus been washed and transferred from No. 1 to No. 2 chamber, the latter then becomes the filter chamber and continues in operation as such until such time as the bed has become foul and requires cleansing, when the sand is transferred in the manner described to No. 1 chamber and cleansed in the process of transference.

If desired, instead of using two or more similar chambers for use as filter chambers and sand separators, an additional chamber of any convenient shape may be employed as a separator to receive the ejected sand and water and its contents would then be returned to whichever filter chamber it has been ejected from. Such an arrangement is illustrated in Fig. 11, where S is the sand and water separator. As an example, when all the sand has been ejected from No. 1 filter chamber into the chamber S, during which the latter is kept at a lower pressure than the filter chamber, it being either closed or open to the atmosphere, the sand would then be returned to No. 1 chamber, during which process the pressure in the chamber S is kept higher than the filter chamber, and subsequent filter chambers may be treated likewise. With such an arrangement many filtering units can be used with one common washing and sand and water separating chamber.

When the filter units are of very large area, it is preferred to divide the filter bed up into sections each with an inverted conical or pyramidal shaped bottom, as illustrated in Figs. 12 and 13. In these figures each large filter chamber is shown circular, but it can be rectangular or any other convenient shape.

Fig. 12 illustrates an arrangement wherein two filter units are employed and the main body portion A of each chamber is divided into eight sections and has eight conical or pyramidal bottoms $B'$ . . . $B^8$, or any other number of sections and bottoms may be provided. S is the washer or sand and water separator, which may be closed or open to the atmosphere. The section marked $B^{16}$ in filter chamber No. 2 in Fig. 12 is shown empty, the sand having been ejected into separator S, whence it is returned to $B^{16}$. To wash the whole of the filter unit, each section is treated in the same manner. $T'$, $T^2$ are the inlet pipes to each filter unit for the water to be filtered, each pipe communicating independently with the upper portion of its particular filter chamber. $V'$, $V^2$ are the outlet pipes for the filtrate and which communicate with the annular spaces formed around the filter chambers.

This arrangement of ejecting and discharging the sand and water into a separate empty chamber enables simpler apparatus to be used for the ejection of the sand from the full chamber to the empty one and, moreover, enables the whole process to be operated under considerably lower pressure for the ejection of the sand from the full chamber to the empty one, the washing or sand separating chamber being open to the atmosphere and therefore at atmospheric pressure; or closed under any suitable lower pressure than the chamber from which the sand is being ejected.

Having thus described the nature of the said invention and the best means I know of carrying the same into practical effect, I claim:—

1. In filtering apparatus of the character described, a body of filtering material, an impervious magazine affording lateral support for a substantially vertical column of said filtering material and extending downwardly to a point determining the effective filtering depth for liquid introduced into the upper end of said column, said filtering material being laterally exposed in a zone below said magazine, means supporting said column below said zone and permitting discharge of filtering material, and a retaining wall outside said magazine intersecting the plane of the lower end of the latter and forming with the exterior of said magazine a passageway for the upward flow of the filtrate from said zone of filtering material.

2. In filtering apparatus of the character described, a plurality of the units as claimed in claim 1, interconnected, and valved means permitting the alternative use of said units.

3. In filtering apparatus of the character described, a plurality of the units as claimed in claim 1, and a washing and separating chamber for the filtering material common to said units and to which said units are connected.

4. A filtering apparatus according to claim 1 wherein the means for supporting the column of filtering material in the zone below the magazine consists of an inverted cone connected to the lower end of the retaining wall.

5. Filtering apparatus comprising in combination a vetrical filter chamber provided with an inverted conical-shaped bottom portion, an inlet at the top of the filter chamber for the liquid to be filtered, an outlet at the bottom of said conical portion for the passage of the filtering material, an annular collecting chamber surrounding the body of the filter chamber, said collecting chamber being closed at the top and open at the bottom, a sand and water separator communicating with the filter chamber, a conduit external to the filter chamber and leading from the outlet at the bottom of said conical portion to said sand and water separator, conduits communicating with the filter chamber for the entrance of the liquid to be filtered and for the discharge of the filtrate and dirty wash water respectively, valves controlling all of the said conduits, and an injector nozzle opening into said first-mentioned conduit.

6. Filtering apparatus comprising a vertical chamber having an inverted conical shaped bottom portion, an annular member depending from the upper end of said chamber and terminating short of the lower end of the latter and dividing said chamber into an inner chamber to contain filtering material and an outer chamber into which the filtered liquid may rise after its passage through said filtering material, a valve-controlled conduit connected to the upper end of said inner chamber for the admission of liquid to be filtered, a valve-controlled conduit connected to the upper portion of said outer chamber for the escape of filtrate therefrom, valve-controlled filtering material receiving and washing means connected to said conical shaped bottom portion of the vertical chamber and to the upper end of said inner chamber, and a valve-controlled injector connected to said filtering material-receiving and washing means adjacent the connection of the latter to said conical shaped bottom portion of said vertical chamber for assisting in the withdrawal of the filtering material from said chamber and its delivery to said receiving and washing means.

7. Filtering apparatus comprising in combination a plurality of chambers, each chamber being divided into vertical sections, each section having an inverted conical-shaped bottom portion, an annular collecting chamber surrounding the body portion of each section, said collecting chambers being closed at the top and open at the bottom, a sand and water separator, conduits communicating at one end with the top of the said separator and at the other end with the bottom of the conical-shaped portions of the filter chamber, conduits communicating at one end with the bottom of the said separator and at the other end with the top of the filter chambers, conduits communicating with the top of the filter chambers for the entrance of the liquid to be filtered, valves for controlling all of said conduits, and injector nozzles opening at the bottom of the conical-shaped bottom portions of the filter chambers into the first-mentioned conduits.

8. Filtering apparatus comprising a plurality of chambers, each chamber being divided into vertical sections forming an inner chamber to contain filtering material and an outer collecting chamber into which the filtered liquid may rise after its passage through said filtering material, each of said outer sections having an inverted cone-shaped bottom portion depending below the lower end of its associated inner section, valved conduits connected to the upper portions of said inner sections for the delivery thereto of liquid to be filtered, valved conduits connected to the upper portions of said outer sections for the escape of filtered liquid therefrom, a sand and liquid separator, valve-controlled conduits connecting the conical shaped bottom portions of said outer sections with the upper portion of said separator, and valve-controlled conduits each connecting the lower portion of said separator with one of said inner sections.

9. Filtering apparatus comprising in combination a plurality of filter chambers, means for ejecting the filtering material from one of said chambers and discharging it into another of said chambers and means for maintaining said last-mentioned chamber at a lower pressure than the first-mentioned chamber.

10. Filtering apparatus comprising in combination a filter chamber, a sand and water separator, means for ejecting the filtering material from said filter chamber and discharging it into said sand and water separator and means for maintaining the said separator at a lower pressure than the said filter chamber.

11. Filtering apparatus comprising a plurality of filter chambers, a sand and water separator, means for ejecting the filtering material in each filter chamber in turn and discharging it into the sand and water separator and means for maintaining the said separator at a lower pressure than the said filter chambers.

In testimony whereof I have signed my name to this specification.

BALFOUR BRAMWELL.